(12) United States Patent
Owen (10) Patent No.: US 11,418,017 B1
(45) Date of Patent: Aug. 16, 2022

(54) MULTI-AXIS ADJUSTABLE ROUGH-IN BOX (71) Applicant: Arfan Owen, Aurora, CO (US)

(72) Inventor: Arfan Owen, Aurora, CO (US)

(*) Notice: Subject to any disclaimer, the term of this patent is extended or adjusted under 35 U.S.C. 154(b) by 0 days.

(21) Appl. No.: 17/234,089

(22) Filed: Apr. 19, 2021

(51) Int. Cl.
H02G 3/12 (2006.01)
H02G 3/08 (2006.01)

(52) U.S. Cl.
CPC ............ *H02G 3/126* (2013.01); *H02G 3/086* (2013.01)

(58) Field of Classification Search
CPC .... H05K 5/0217; H05K 5/0204; H02G 3/081; H02G 3/08; H02G 3/125; H02G 3/123; H02G 3/121; H02G 3/12; H02G 3/126
See application file for complete search history.

(56) References Cited

U.S. PATENT DOCUMENTS

| | | | | |
|---|---|---|---|---|
| 5,223,673 | A * | 6/1993 | Mason | H02G 3/16 174/53 |
| 5,289,934 | A * | 3/1994 | Smith | H02G 3/126 220/3.9 |
| 5,476,183 | A | 12/1995 | Harpenan | |
| 6,786,463 | B1 | 9/2004 | Collum | |
| 7,204,267 | B1 | 4/2007 | Persico | |
| 9,834,914 | B2 | 12/2017 | Ben Jacov | |
| 10,253,512 | B2 | 4/2019 | McAuley | |
| 10,756,522 | B2 * | 8/2020 | Losaw | H01R 25/006 |
| 11,159,004 | B2 * | 10/2021 | Cohen | H02G 3/12 |
| 2004/0080244 | A1 * | 4/2004 | Lowther, Jr. | A47B 57/10 312/223.1 |
| 2010/0132810 | A1 | 6/2010 | Pompian | |
| 2010/0288554 | A1 * | 11/2010 | Jafari | H02G 3/126 174/545 |
| 2014/0224533 | A1 * | 8/2014 | Brey | H02G 3/123 174/480 |
| 2020/0224890 | A1 | 7/2020 | Spanger | |
| 2021/0296871 | A1 * | 9/2021 | De Backer | H02G 3/086 |

FOREIGN PATENT DOCUMENTS

WO WO2017044583 3/2017

* cited by examiner

*Primary Examiner* — Hoa C Nguyen
*Assistant Examiner* — Amol H Patel (57) ABSTRACT A multi-axis adjustable rough-in box for flushing electrical plugs and fixtures with walls includes a mounting bracket with a plurality of attachment apertures to receive hardware to attach to a wall stud. The bracket inner edge has a set of three screw notches. An adjustment frame is coupled to the mounting bracket. A set of three adjustment screws is coupled to the mounting bracket and extends through the adjustment frame. Each adjustment screw has a gear. A plurality of clips is coupled to the adjustment frame. A rough-in box has a box inner side with a plurality of adjustment apertures selectively engageable with the plurality of clips. The box inner side has a plurality of channels in operational communication with the gear of each of the three adjustment screws such that rotation of the adjustment screws causes movement of the rough-in box relative to the adjustment frame.

8 Claims, 11 Drawing Sheets

MULTI-AXIS ADJUSTABLE ROUGH-IN BOX

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to rough-in box devices and more particularly pertains to a new rough-in box device for flushing electrical plugs and fixtures with walls. The present device includes a mounting bracket attached to an adjustment mechanism. The rough-in box is in operational communication with the adjustment mechanism to pivot along multiple axes by turning a plurality of adjustment screws.

Description of Related Art Including Information Disclosed Under 37 CFR 1.97 and 1.98

The prior art relates to rough-in box devices. Known devices include multiple attachment points and adjustable arms to allow for installation in a variety of positions and angles. These devices, however, lack the ability to be pivoted once installed. Known devices do not have adjustment screws or allow for adjustment on multiple axes.

BRIEF SUMMARY OF THE INVENTION

An embodiment of the disclosure meets the needs presented above by generally comprising a mounting bracket having a bracket front side, a bracket back side, a bracket inner edge, and a bracket outer edge. The mounting bracket has a plurality of attachment apertures extending from the bracket front side through the bracket back side and configured to receive hardware to attach to a wall stud. The bracket inner edge has a set of three screw notches. An adjustment frame is coupled to the mounting bracket. The adjustment frame has a frame front side coupled to the bracket back side adjacent the bracket inner edge, a frame back side, a frame top side, a frame bottom side, and a frame outer side. A set of three adjustment screws is coupled to the adjustment frame. Each adjustment screw is rotatable and extends between the frame front side and the frame back side. Each adjustment screw has a gear. A plurality of clips is coupled to the adjustment frame. The plurality of clips is coupled to the frame top side and the frame bottom side. A rough-in box has a box top side, a box bottom side, a box inner side, a box outer side, an open box front side, and a box back side. The rough-in box is configured to receive an electrical plug or fixture. The box inner side has a plurality of adjustment apertures extending therethrough. The plurality of adjustment apertures is selectively engageable with the plurality of clips. The box inner side has a plurality of channels in operational communication with the gear of each of the three adjustment screws such that rotation of the adjustment screws causes movement of the rough-in box relative to the adjustment frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
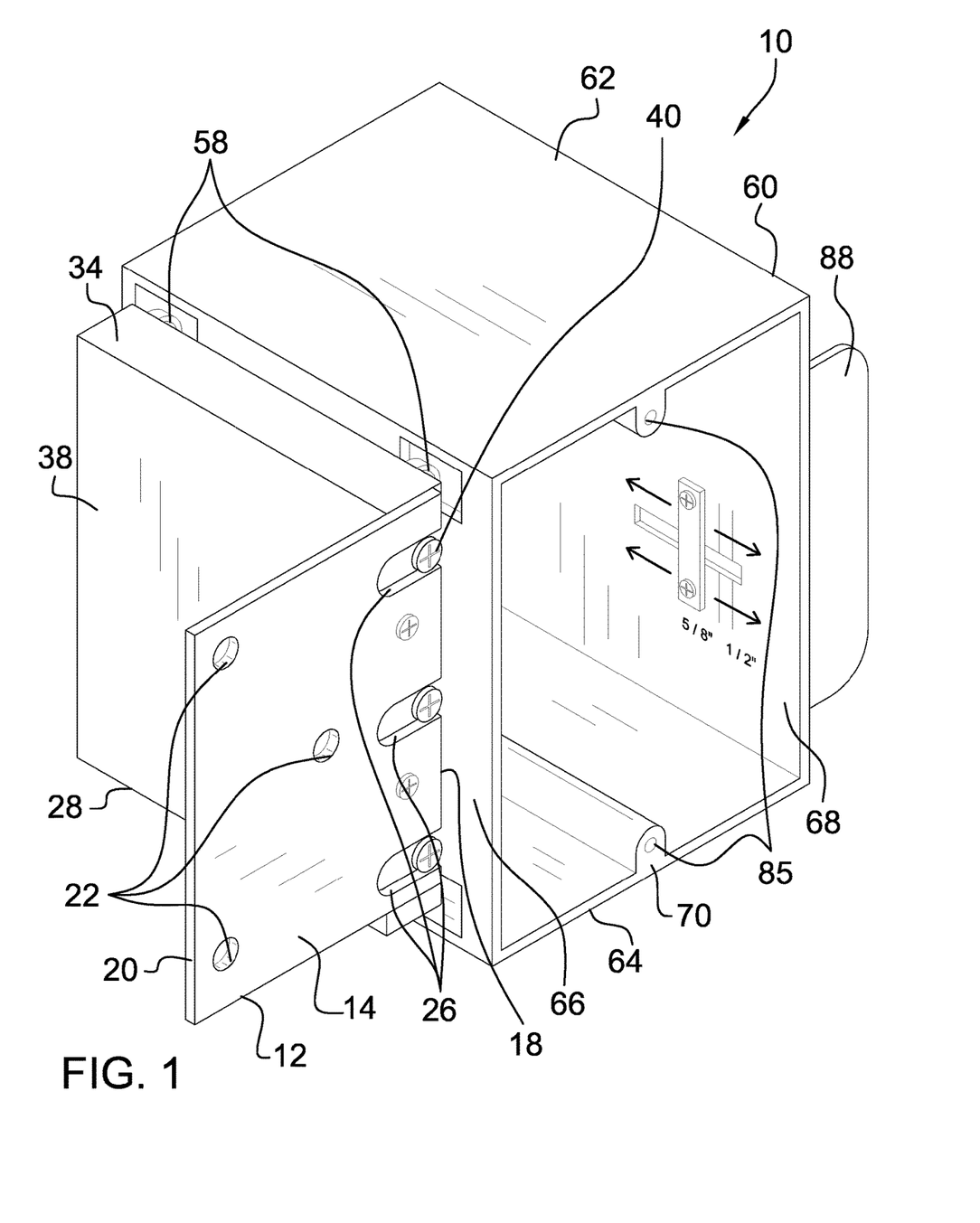
FIG. 1 is an isometric view of a multi-axis adjustable rough-in box according to an embodiment of the disclosure.
Figure 2:
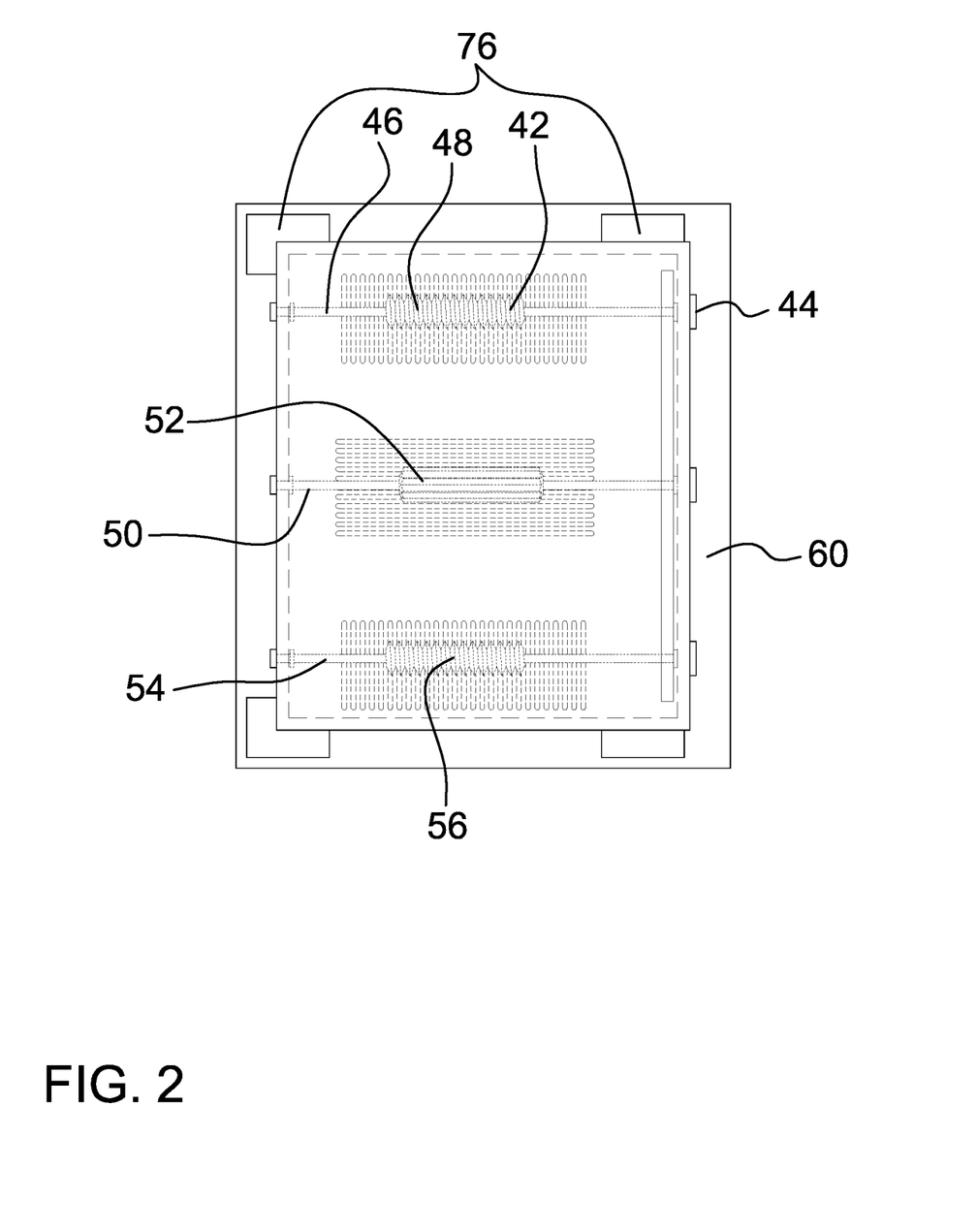
FIG. 2 is a front elevation view of an embodiment of the disclosure.
Figure 3:
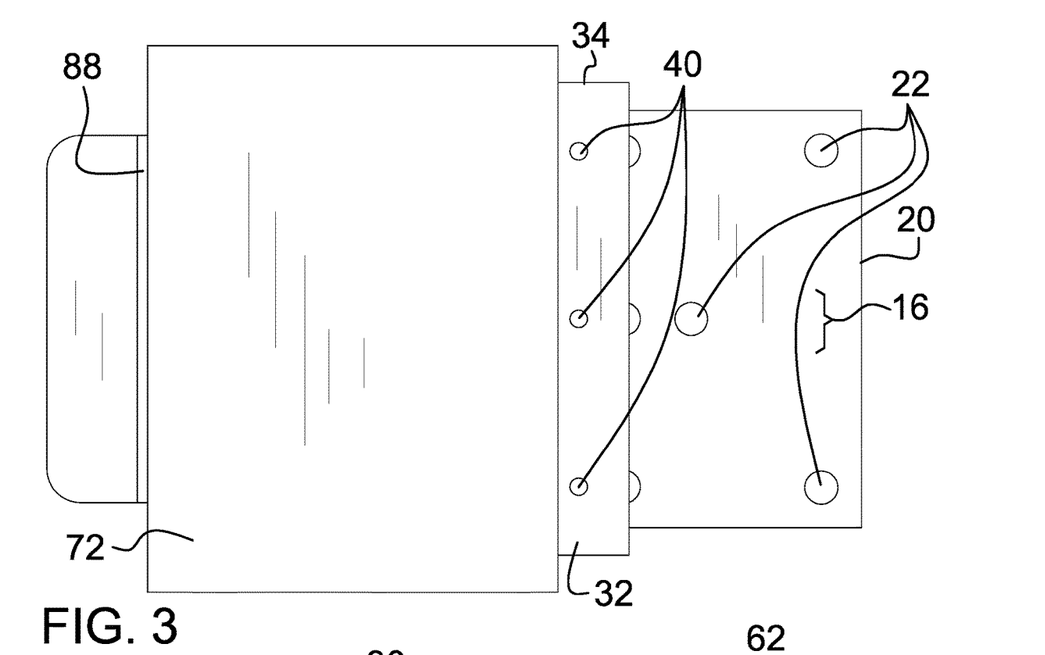
FIG. 3 is a side elevation view of an embodiment of the disclosure.
Figure 4:
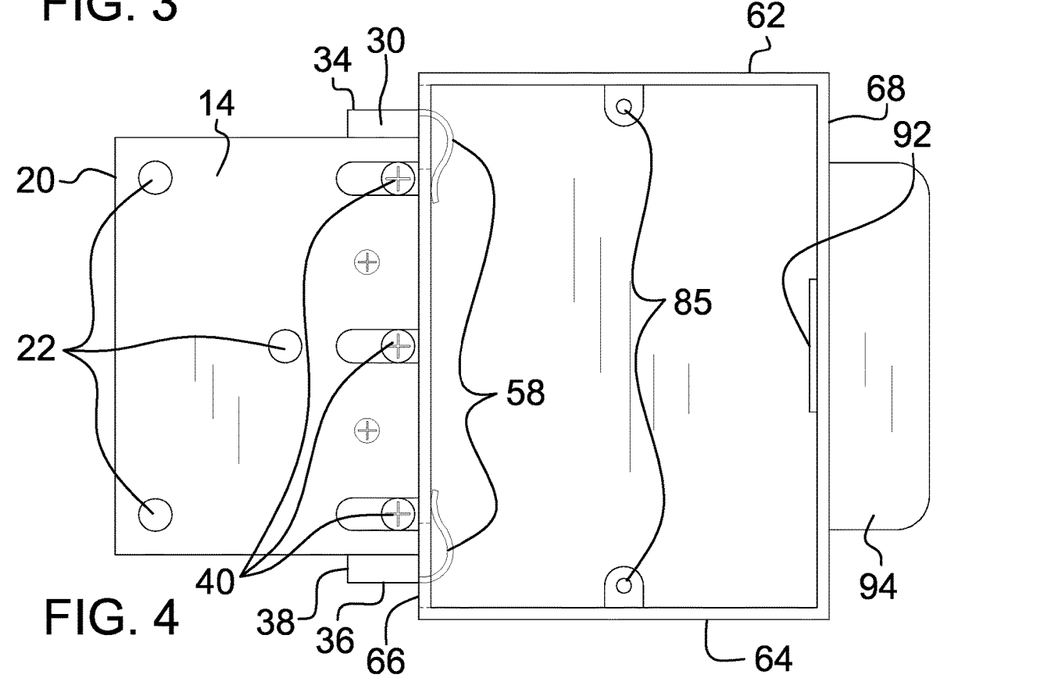
FIG. 4 is a side elevation view of an embodiment of the disclosure.
Figure 5:
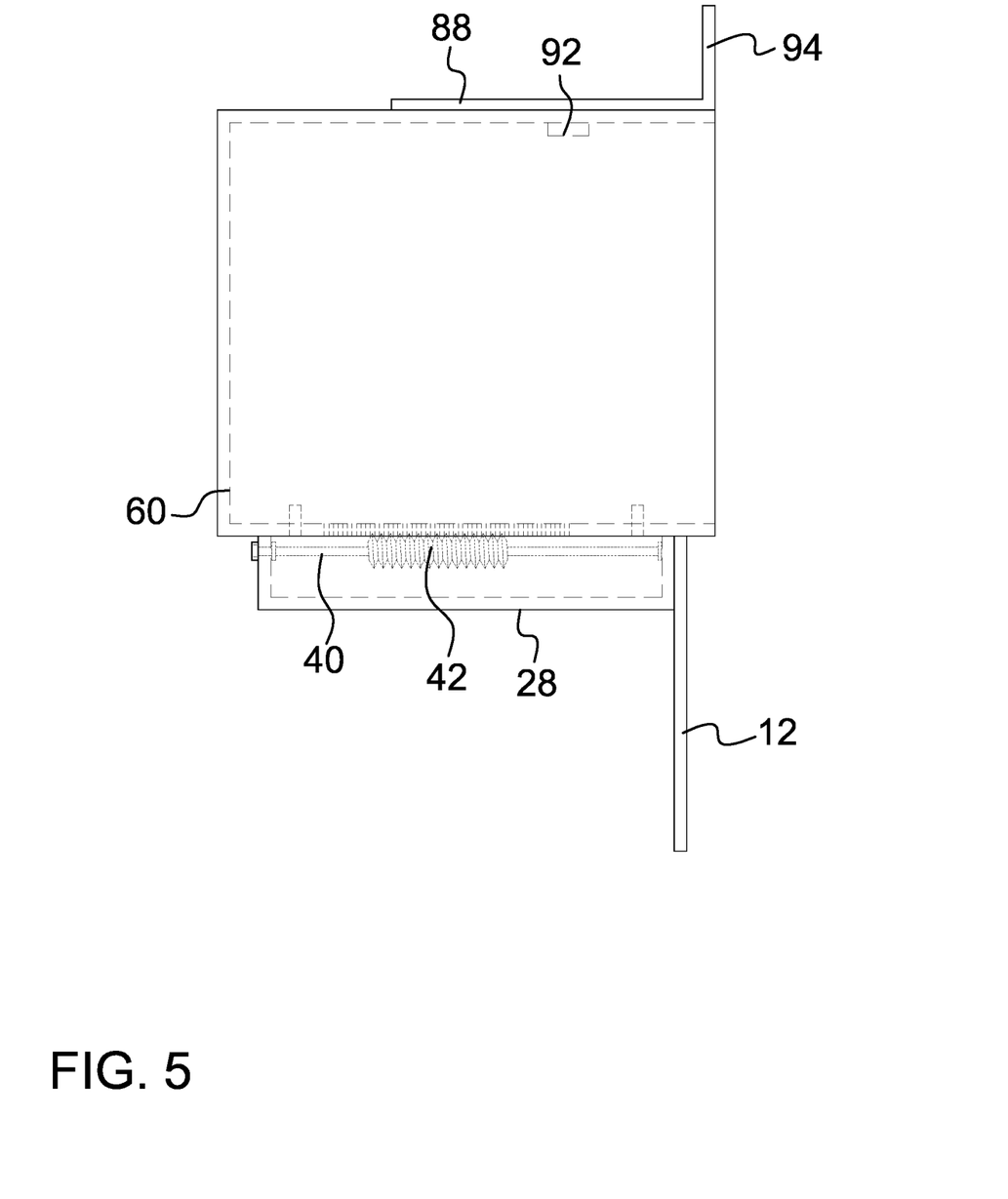
FIG. 5 is a top plan view of an embodiment of the disclosure.
Figure 6:
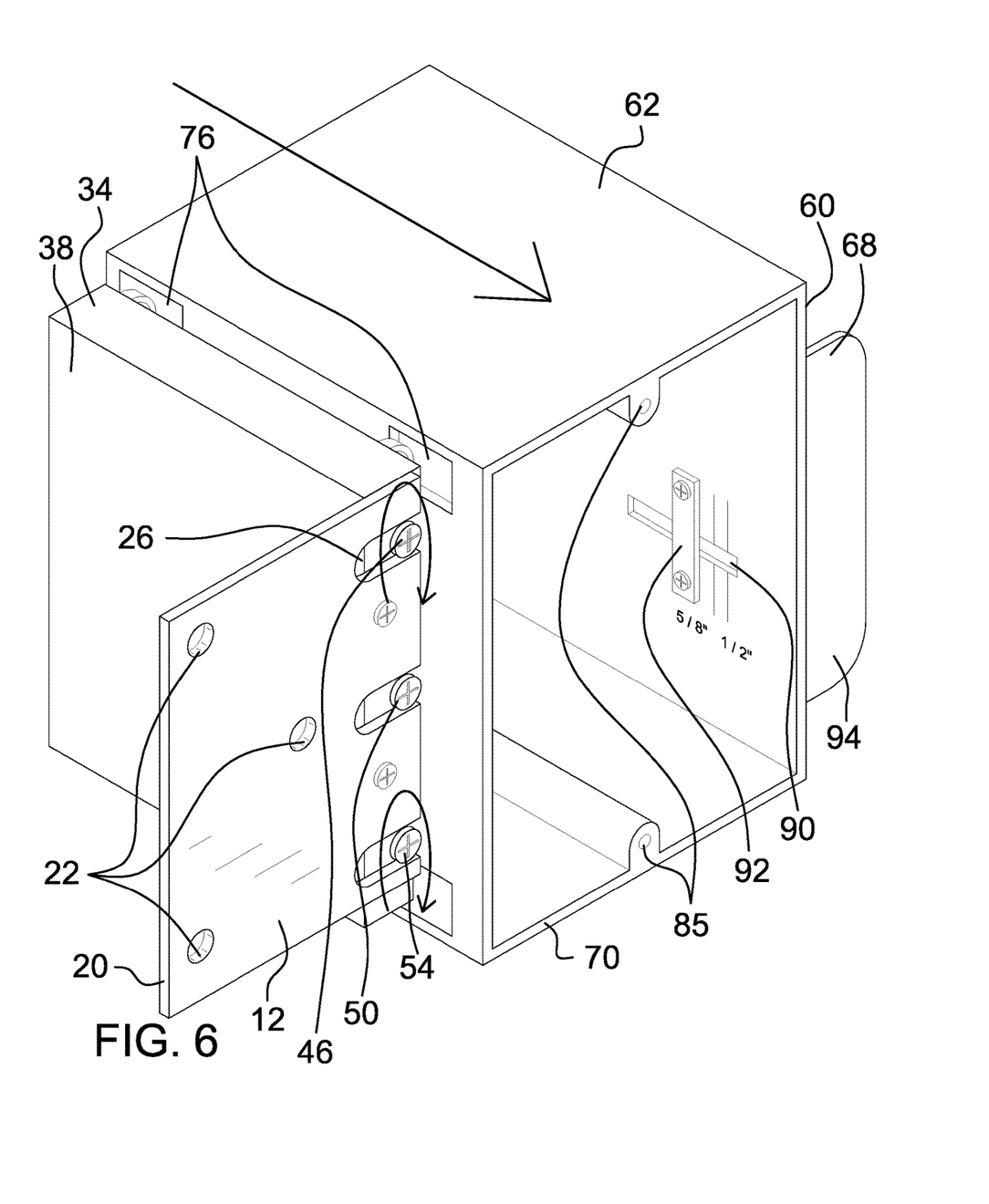
FIG. 6 is an isometric view of an embodiment of the disclosure.
Figure 7:
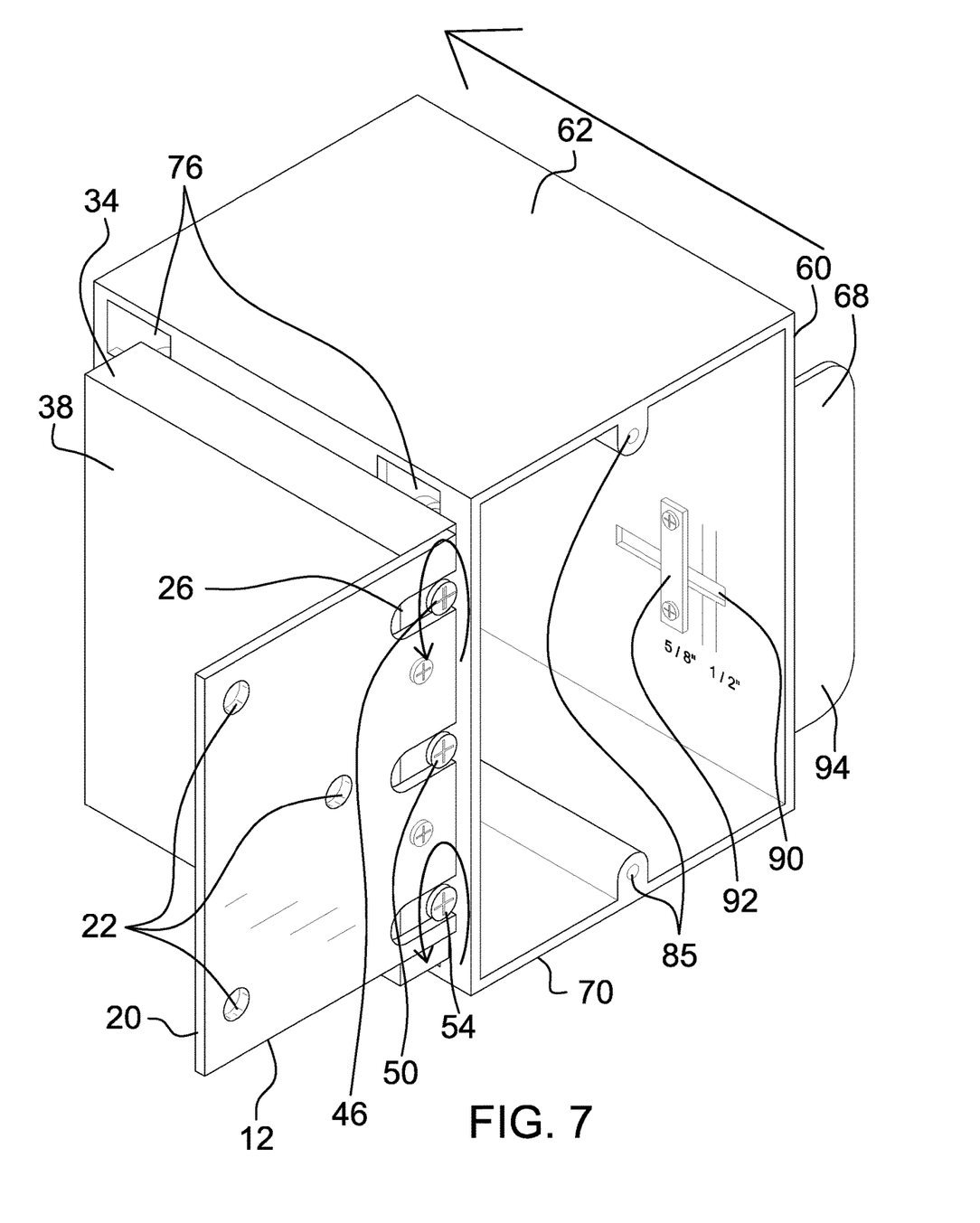
FIG. 7 is an isometric view of an embodiment of the disclosure.
Figure 8:
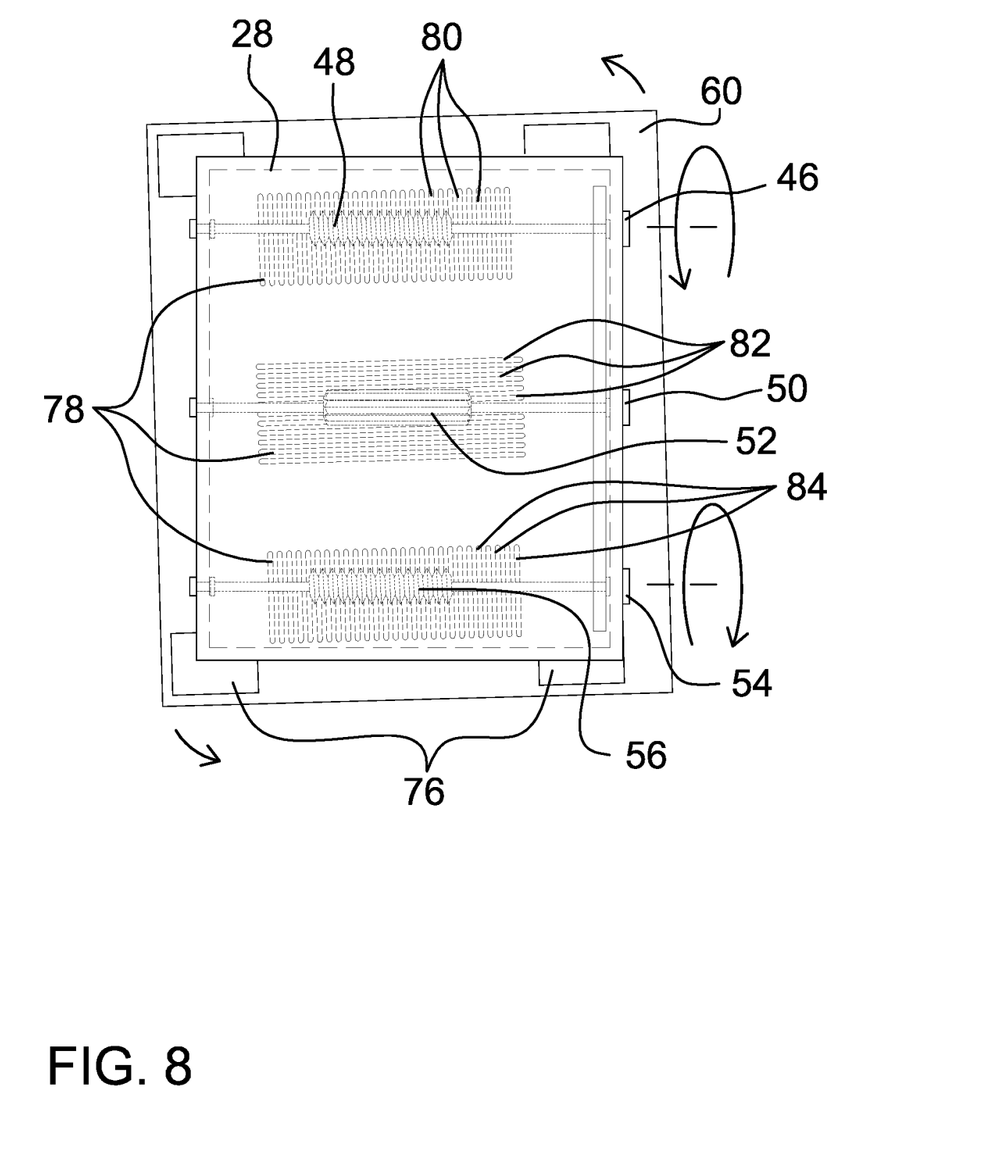
FIG. 8 is a side elevation view of an embodiment of the disclosure.
Figure 9:
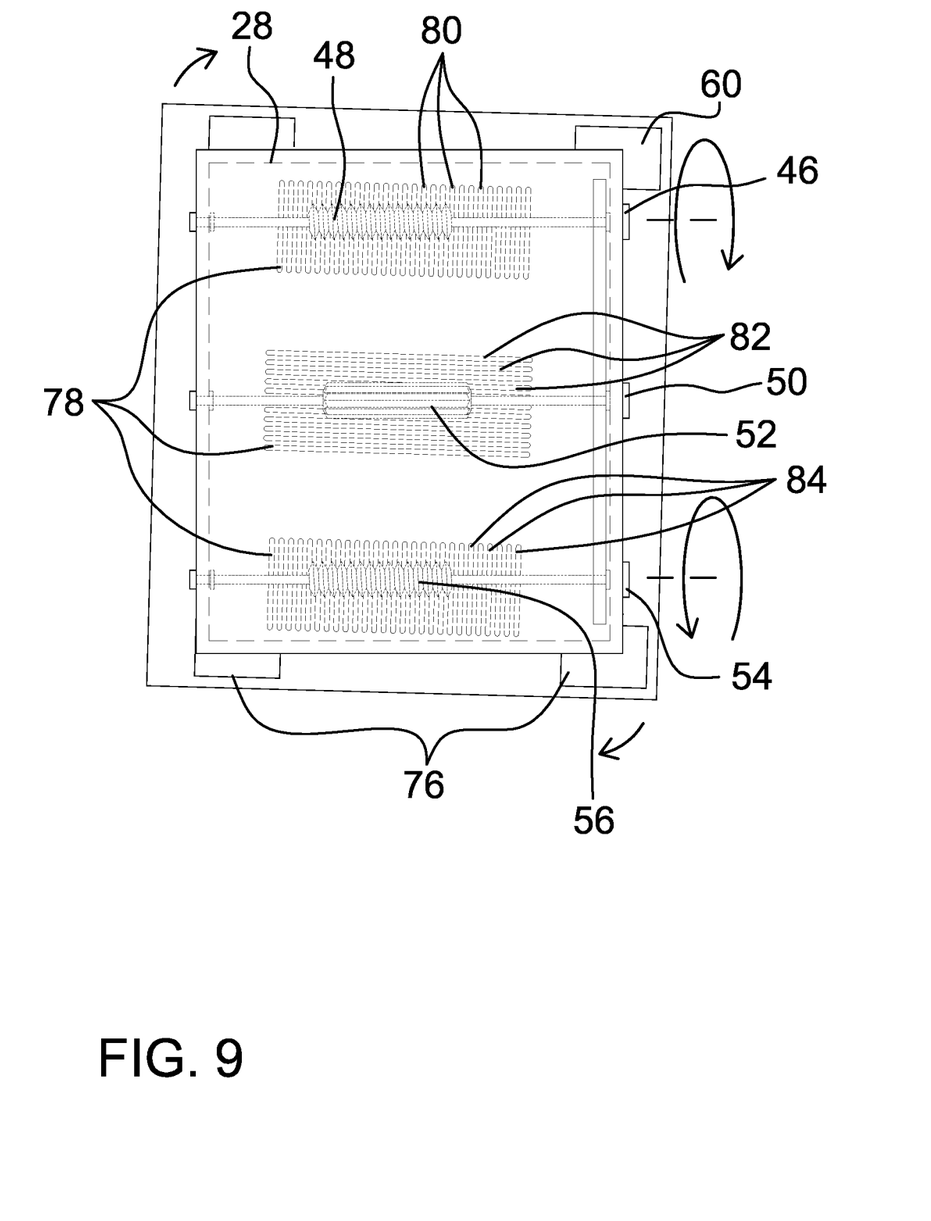
FIG. 9 is a side elevation view of an embodiment of the disclosure.
Figure 10:
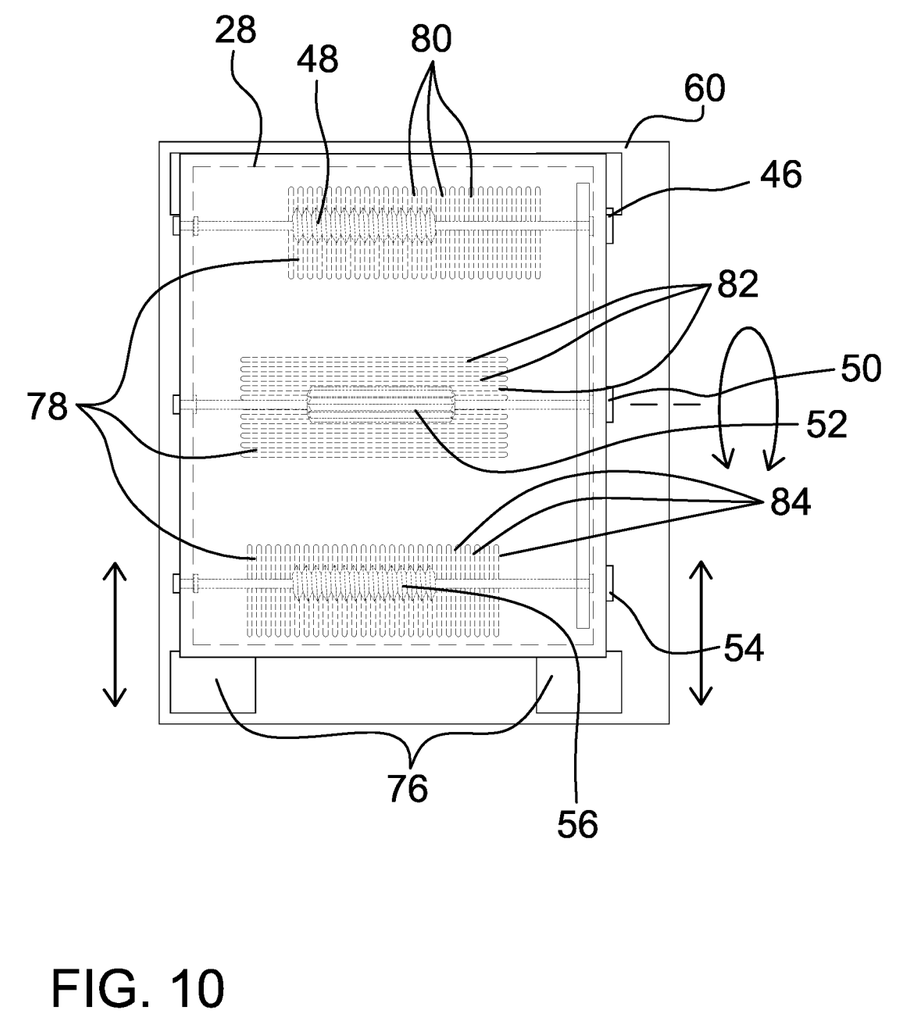
FIG. 10 is a side elevation view of an embodiment of the disclosure.
Figure 11:
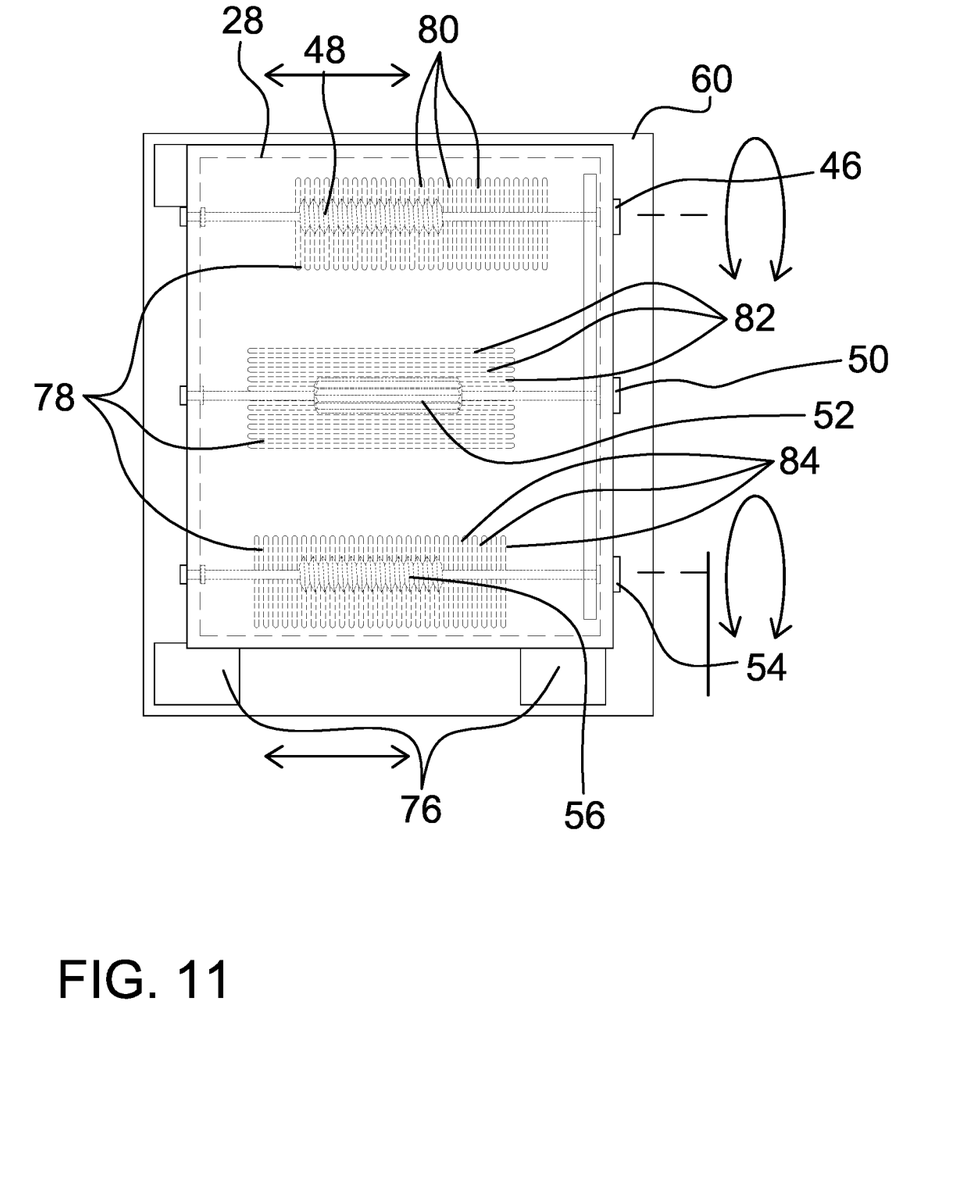
FIG. 11 is a side elevation view of an embodiment of the disclosure.
Figure 12:
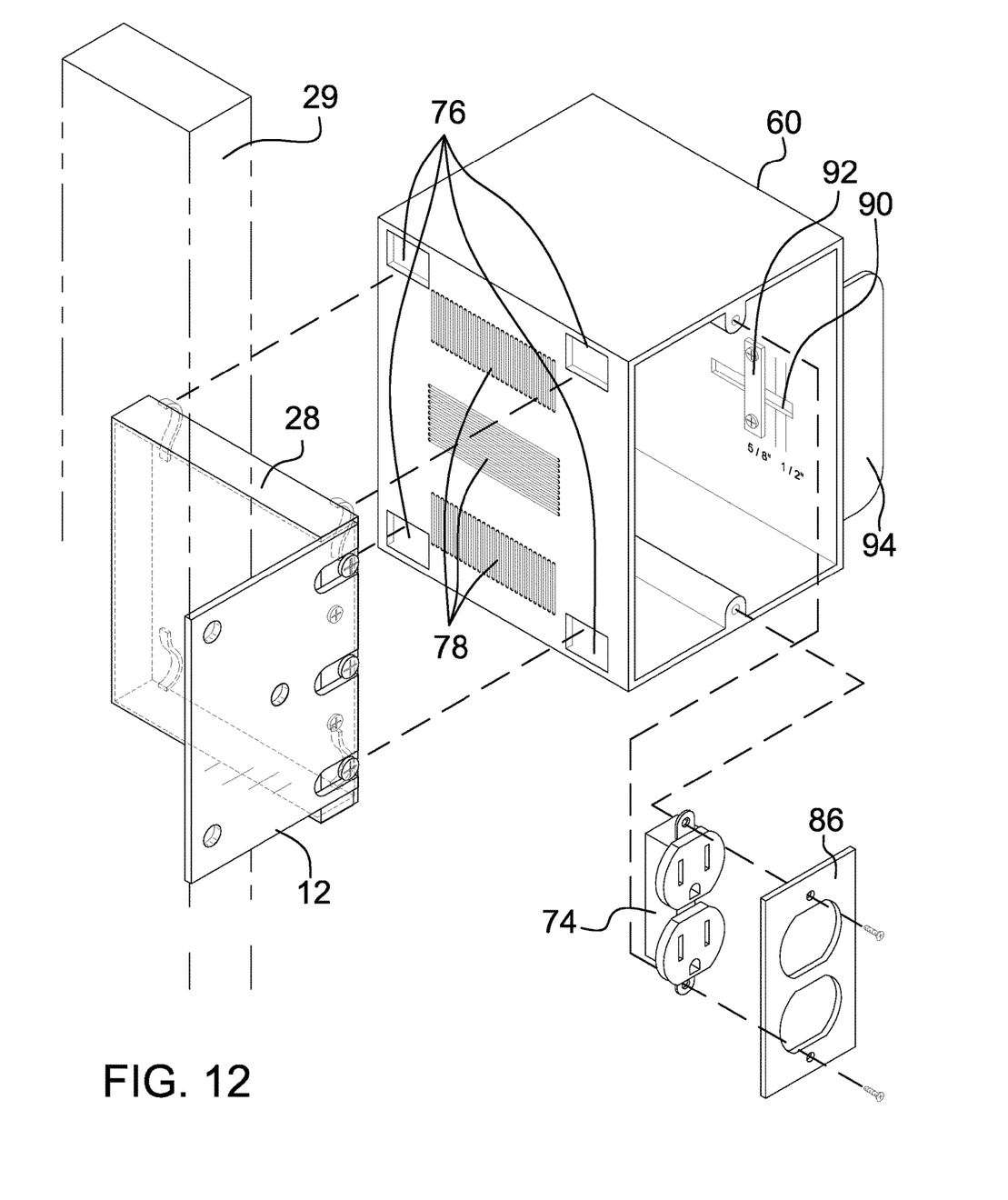
FIG. 12 is an isometric exploded view of an embodiment of the disclosure.

With reference now to the drawings, and in particular to FIGS. 1 through 12 thereof, a new rough-in box device embodying the principles and concepts of an embodiment of the disclosure and generally designated by the reference numeral 10 will be described.

As best illustrated in FIGS. 1 through 12, the multi-axis adjustable rough-in box 10 generally comprises a mounting bracket 12 having a bracket front side 14, a bracket back side 16, a bracket inner edge 18, and a bracket outer edge 20. The mounting bracket 12 has a plurality of attachment apertures 22 extending from the bracket front side 14 through the bracket back side 16 and configured to receive hardware to attach to a wall stud 24. The bracket inner edge has a set of three screw notches 26.

An adjustment frame 28 is coupled to the mounting bracket 12. The adjustment frame 28 has a frame front side 30 coupled to the bracket back side 16 adjacent the bracket inner edge 18, a frame back side 32, a frame top side 34, a frame bottom side 36, and a frame outer side 38. A set of three adjustment screws 40 is coupled to the adjustment frame 28. Each adjustment screw 40 is rotatable and extends between the frame front side 30 and the frame back side 32. Each adjustment screw 40 has a gear 42 and a head 44 accessible through the respective screw notch 26. The set of three adjustment screws 40 includes a top adjustment screw 46 having a top worm gear 48, a medial adjustment screw 50 having a pinion gear 52, and a bottom adjustment screw 54 having a bottom worm gear 56. A plurality of clips 58 is coupled to the adjustment frame 28. The plurality of clips 58 is coupled to the frame top side 34 and the frame bottom side 36. Each of the clips 58 may be a curved spring clip 58.

A rough-in box 60 has a box top side 62, a box bottom side 64, a box inner side 66, a box outer side 68, an open box front side 70, and a box back side 72. The rough-in box 60 is configured to receive an electrical plug or fixture 74. The box inner side 66 has a plurality of adjustment apertures 76 extending therethrough. The plurality of adjustment apertures 76 is selectively engageable with the plurality of clips 58. Each of the adjustment apertures 76 may be rectangular to allow movement in multiple directions.

The box inner side 66 has a plurality of channels 78 is in operational communication with the gear 42 of each of the three adjustment screws such that rotation of the adjustment screws 40 causes movement of the rough-in box 60 relative to the adjustment frame 28. The plurality of channels 78 includes an array of top vertical channels 80 in operational communication with the top worm gear 48, an array of medial horizontal channels 82 in operational communication with the pinion gear 52, and an array of bottom vertical channels 84 in operational communication with the bottom worm gear 56. The box front side 70 may have a pair of plate apertures 85 extending through the box top side 62 and the box bottom side 64. The pair of plate apertures 84 is configured to receive hardware to attach a faceplate 86.

An outer bracket 88 may be coupled to the rough-in box 60. The outer bracket 88 is coupled to the box outer side 68. The outer bracket 88 is slidably coupled to an adjustment slot 90 extending through the box outer side 68. The outer bracket 88 has an adjustment cleat 92 selectively engageable with the box outer side 68 to fix the offset distance between a perpendicular bracket lip 94 of the outer bracket and the box front side 70 of the rough-in box. The outer bracket 88 may thus be adjusted to rest against the wall to flush the rough-in box 60.

In use, the mounting bracket 12 is secured to the wall stud 24. The rough-in box 60 is then engaged with the plurality of clips 58. The set of three adjustment screws 40 are then rotated to create a variety of translational and pivoting movements along three axes in order to properly orient the rough-in box 60 (as shown in FIGS. 6-11).

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multi-axis adjustable rough-in box comprising:
   a mounting bracket having a bracket front side, a bracket back side, a bracket inner edge, and a bracket outer edge, the mounting bracket having a plurality of attachment apertures extending from the bracket front side through the bracket back side and configured to receive hardware to attach to a wall stud, the bracket inner edge having a set of three screw notches;
   an adjustment frame coupled to the mounting bracket, the adjustment frame having a frame front side coupled to the bracket back side adjacent the bracket inner edge, a frame back side, a frame top side, a frame bottom side, and a frame outer side;
   a set of three adjustment screws coupled to the adjustment frame, each adjustment screw being rotatable and extending between the frame front side and the frame back side, each adjustment screw having a gear;
   a plurality of clips coupled to the adjustment frame, the plurality of clips being coupled to the frame top side and the frame bottom side; and
   a rough-in box having a box top side, a box bottom side, a box inner side, a box outer side, an open box front side, and a box back side, the rough-in box being configured to receive an electrical plug or fixture, the box inner side having a plurality of adjustment apertures extending therethrough, the plurality of adjustment apertures being selectively engageable with the plurality of clips, the box inner side having a plurality of channels in operational communication with the gear of each of the three adjustment screws such that rotation of the adjustment screws causes movement of the rough-in box relative to the adjustment frame.

2. The multi-axis adjustable rough-in box of claim 1 further comprising the set of three adjustment screws including a top adjustment screw having a top worm gear, a medial adjustment screw having a pinion gear, and a bottom adjustment screw having a bottom worm gear; the plurality of channels including an array of top vertical channels in operational communication with the top worm gear, an array of medial horizontal channels in operational communication with the pinion gear, and an array of bottom vertical channels in operational communication with the bottom worm gear.

3. The multi-axis adjustable rough-in box of claim 1 further comprising each of the adjustment apertures being rectangular.

4. The multi-axis adjustable rough-in box of claim 1 further comprising each of the clips being a curved spring clip.

5. The multi-axis adjustable rough-in box of claim 1 further comprising an outer bracket coupled to the rough-in box, the outer bracket being coupled to the box outer side.

6. The multi-axis adjustable rough-in box of claim 5 further comprising the outer bracket being slidably coupled to an adjustment slot extending through the box outer side, the outer bracket having an adjustment cleat selectively engageable with the box outer side to fix the offset distance between a perpendicular bracket lip of the outer bracket and the box front side of the rough-in box.

7. The multi-axis adjustable rough-in box of claim 1 further comprising the box front side having a pair of plate apertures extending through the box top side and the box bottom side, the pair of plate apertures being configured to receive hardware to attach a faceplate.

8. A multi-axis adjustable rough-in box comprising:
- a mounting bracket having a bracket front side, a bracket back side, a bracket inner edge, and a bracket outer edge, the mounting bracket having a plurality of attachment apertures extending from the bracket front side through the bracket back side and configured to receive hardware to attach to a wall stud, the bracket inner edge having a set of three screw notches;
- an adjustment frame coupled to the mounting bracket, the adjustment frame having a frame front side coupled to the bracket back side adjacent the bracket inner edge, a frame back side, a frame top side, a frame bottom side, and a frame outer side;
- a set of three adjustment screws coupled to the adjustment frame, each adjustment screw being rotatable and extending between the frame front side and the frame back side, each adjustment screw having a gear, the set of three adjustment screws including a top adjustment screw having a top worm gear, a medial adjustment screw having a pinion gear, and a bottom adjustment screw having a bottom worm gear; a plurality of clips coupled to the adjustment frame, the plurality of clips being coupled to the frame top side and the frame bottom side, each of the clips being a curved spring clip;
- a rough-in box having a box top side, a box bottom side, a box inner side, a box outer side, an open box front side, and a box back side, the rough-in box being configured to receive an electrical plug or fixture, the box inner side having a plurality of adjustment apertures extending therethrough, the plurality of adjustment apertures being selectively engageable with the plurality of clips, each of the adjustment apertures being rectangular, the box inner side having a plurality of channels in operational communication with the gear of each of the three adjustment screws such that rotation of the adjustment screws causes movement of the rough-in box relative to the adjustment frame, the plurality of channels including an array of top vertical channels in operational communication with the top worm gear, an array of medial horizontal channels in operational communication with the pinion gear, and an array of bottom vertical channels in operational communication with the bottom worm gear, the box front side having a pair of plate apertures extending through the box top side and the box bottom side, the pair of plate apertures being configured to receive hardware to attach a faceplate; and
- an outer bracket coupled to the rough-in box, the outer bracket being coupled to the box outer side, the outer bracket being slidably coupled to an adjustment slot extending through the box outer side, the outer bracket having an adjustment cleat selectively engageable with the box outer side to fix the offset distance between a perpendicular bracket lip of the outer bracket and the box front side of the rough-in box.

\* \* \* \* \*